TWO DIMENSIONAL HYDRAULIC TRACING SYSTEM

Filed Nov. 14, 1963 6 Sheets-Sheet 1

INVENTOR
JOHN F. VERHOEVEN

Dec. 14, 1965 J. F. VERHOEVEN 3,222,998

TWO DIMENSIONAL HYDRAULIC TRACING SYSTEM

Filed Nov. 14, 1963 6 Sheets-Sheet 3

TWO DIMENSIONAL HYDRAULIC TRACING SYSTEM

Filed Nov. 14, 1963 6 Sheets-Sheet 4

| TRACER VALVE CONDITION | | | MOVEMENT OF SLIDE (as viewed in Fig. 4) | | | RELATIVE MOVEMENT OF STYLUS TOOL TO PATTERN & WORK RESPECTIVELY | | | |
|---|---|---|---|---|---|---|---|---|---|
| Description | Position of Stylus (Fig. 2) | Position of Valve Member | X Slide | Y Slide | Resultant | X Direction | Y Direction | Resultant Direction | in (Fig. 4) |
| line \ column | A | B | C | D | E | F | G | H | I |
| 1 over over deflected | u | Fig. 10 | ← | ○ | ← | → | ○ | → | m |
| 2 between over over deflected & over deflected | between t & u | between Fig. 10 & Fig. 9 | ← | ↑ | ↖ | → | ↓ | ↘ | l |
| 3 over deflected | t | Fig. 9 | ○ | ↑ | ↑ | ○ | ↓ | ↓ | k, n |
| 4 between over deflected & null | between s & t | between Fig. 9 & Fig. 8 | → | ↑ | ↗ | ← | ↓ | ↙ | j |
| 5 central or null | s | Fig. 8 | → | ○ | → | ← | ○ | ← | c, i, o |
| 6 between null & under deflected | between r & s | between Fig. 8 & Fig. 7 | → | ↓ | ↘ | ← | ↑ | ↖ | h |
| 7 under deflected | r | Fig. 7 | ○ | ↓ | ↓ | ○ | ↑ | ↑ | b, d, g |
| 8 between under deflected & under under deflected | between q & r | between Fig. 7 & Fig. 6 | ← | ↓ | ↙ | → | ↑ | ↗ | f |
| 9 under under deflected | q | Fig. 6 | ← | ○ | ← | → | ○ | → | e |
| 10 vertical or hang free | p | Fig. 2 | ← | ○ | ← | → | ○ | → | a |

Fig. 5

Dec. 14, 1965 J. F. VERHOEVEN 3,222,998

TWO DIMENSIONAL HYDRAULIC TRACING SYSTEM

Filed Nov. 14, 1963 6 Sheets-Sheet 5

Dec. 14, 1965 J. F. VERHOEVEN 3,222,998

TWO DIMENSIONAL HYDRAULIC TRACING SYSTEM

Filed Nov. 14, 1963 6 Sheets-Sheet 6

United States Patent Office 3,222,998

Patented Dec. 14, 1965

3,222,998

TWO DIMENSIONAL HYDRAULIC TRACING SYSTEM

John F. Verhoeven, Cincinnati, Ohio, assignor to The Cincinnati Milling Machine Co., Cincinnati, Ohio, a corporation of Ohio Filed Nov. 14, 1963, Ser. No. 323,730
16 Claims. (Cl. 91—413)

The present invention relates to two dimensional hydraulic tracing for the control of a machine cutting element in accordance with a pattern and, more particularly, to that type of tracing in which the direction of movement of the cutting element (relative to a workpiece) is determined by the extent of deflection of a tracer stylus by the pattern.

Generally, in two dimensional machine tracing, a cutting tool and the workpiece are mounted for relative movement therebetween in a plane. The relative movement between the cutting tool and the work is usually provided by two slides driven by different motors in directions normal to each other. A pattern and a stylus-operated tracing valve are mounted in the machine to partake of the same relative movement as between the cutting tool and the work, and the slide motors are controlled by deflection of the tracing valve stylus.

In manually controlled tracing in a plane, relative movement between the cutting tool and the work, and between the stylus-operated tracing valve and the pattern, is effected by manual deflection of the stylus by the operator. The direction of relative movement between the cutter and the work is determined by the direction of deflection of the stylus by the operator, and the operator is guided in this deflection of the stylus by the pattern. In a typical example of this type of system (see U.S. Patent 3,084,899, issued April 9, 1963 to L. A. Dever et al.) the two valves, or valve portions, which control relative movement in a plane between the cutter and the workpiece and between the stylus-operated tracing valve and the pattern, are spaced around the stylus ninety degrees apart. Movable valve members in the valve portions are connected to the stylus for movement in accordance with the extent and direction of deflection of the stylus by the operator. The two valve portions are connected to the slide member motors to produce the relative movement between the cutting tool and the work (and between the stylus-operated tracing valve and the pattern) in a direction corresponding to the direction of deflection of the stylus by the operator. The stylus can be deflected in any direction in the plane by the operator and hence relative movement between the cutting tool and the work can be effected in any direction in the plane. Thus the cutter can be moved through a full 360 degrees around the workpiece along a path which closes on itself, but the stylus must be manually controlled by the operator for continuous engagement with the pattern and for deflection in the desired direction of travel around the pattern.

Automatic tracing in a plane through 360 degrees, without the need of deflection or biasing of the stylus by the operator, has been accomplished, as, for example, shown in U.S. Patent 2,332,533 issued October 26, 1943 to E. G. Roehm. In this type of system, the stylus (which, when undeflected, hangs normal to the pattern) rotates about a longitudinal axis which is slightly displaced from and parallel to the stylus axis. This rotation of the stylus, which causes a slight orbital movement thereof, is effected by a steering motor controlled by a steering valve which responds to deflection of the stylus by the pattern. The steering motor is stopped when the stylus is in a predetermined angular position with respect to the eccentric orbital axis and the stylus is deflected a predetermined amount by engagement with the edge of the pattern. The movable valve members of the valve portions which control the slide motor are operated by an eccentric cam, or cams, which rotate with the stylus to effect relative movement of the stylus-operated valve with respect to the pattern in a direction parallel to the edge of the pattern. Thus, the direction of movement of the cutter relative to the workpiece (which in the same as the direction of movement of the tracer valve with respect to the pattern) is determined by the angular position of the stylus about the eccentric orbital axis thereof.

In any system is which 360 degree tracer controlled movement of a cutter relative to a workpiece is to be effected, it is mandatory that both of the tracer valves which control, respectively, the two slide motors be able to effect reversible operation of both slide motors.

Significantly simpler two dimensional automatic tracing systems have been devised in which the tracing stylus requires no manual biasing or deflection by the operator and in which no steering motor, steering valve, or cams, are required. In these simpler systems, as in the system disclosed herein, the direction of the cutter relative to the workpiece is determined by the extent of deflection, or displacement, of the stylus and not by the direction of deflection of the stylus, nor by the angular position of the stylus about an eccentric parallel longitudinal axis. Prior art systems of this simpler type have, heretofore, been unable to trace through a full 360 degrees.

For example, in one prior art example of this type system (shown in U.S. Patent 3,026,680, issued March 27, 1962 to W. I. Evans) two valve portions (which are connected together in an integral unit) are provided, one to control one slide motor and one to control the other slide motor. The position of the movable valve member (which can be considered as two connected valve members, one for each of the valve portions) is determined by the extent of deflection of the stylus and, in turn, determines the direction of movement of the cutter relative to the workpiece. As the movable valve member moves through its operating range (in response to increasing or decreasing deflection of the stylus), it produces reversible movement of one motor and unidirectional movement of the other motor. More specifically, as the movable valve member moves from one end of its operating range to the other, it causes, sequentially, one motor to run in one direction, stop, and run in the opposite direction. This movement of the valve member, at the same time, causes the other motor, sequentially, to stop, run in one direction, and stop. Thus, the motors are operated in staggered relation, but, with one motor capable of running in only one direction, tracing can be effected through only 180 degrees. If the motor be considered in one operating condition when running and in another operating condition when stopped, it will be noted that, in this prior art disclosure, each motor undergoes two changes of operating condition as the valve member moves from one end of its operating range to the other. In this prior art disclosure, one side only of the unidirectional motor is connected to the tracing valve.

An extension of the tracing range in this simpler type of system beyond 180 degrees has been achieved (see U.S. Patent 2,969,717 issued January 31, 1961, to B. W. Carter) by connecting a source of reduced pressure to the other side of the previously unidirectional motor, making reversible operation of both motors possible. With this added source of reduced pressure, the slide motor connected thereto could undergo four changes of operating condition as the valve member moved through its operating range. The other slide motor, however, could only undergo two changes of operating condition as the valve member moved through its operating range, and 360 degree tracing could not be achieved.

In another known system, the range of tracing has been extended to 270 degrees by providing a tracing valve having two valve portions each with a set of operating ports (connected to a pressure and a return line) and a set of motor ports (connected to opposite sides of one of the slide motors). The operating ports and one motor port of each valve portion are controlled by a movable valve member as it moves through an operating range in response to increasing or decreasing deflection of a stylus to effect staggered operation of two motors connected, respectively, to the motor ports of the two valve portions. With this arrangement, each motor undergoes three changes of operating condition as the valve member moves through its operating range.

In the present invention, a simple, automatic, improved tracing system of the type in which the direction of the cutter is determined by the extent of deflection of the stylus, and mechanism for this system, is provided. As in previous systems of this general type, the stylus is automatically biased against the pattern and displaced thereby without the intervention of the operator, and no steering mechanism is required. The system, and mechanism, of the present invention produces, unlike prior art systems of this general type, full 360 degree automatic tracing. The valve portion which controls each slide motor effects four changes of operating condition in the motor as the movable valve member moves from one end of its operating range to the other. This is achieved by controlling at least two operating ports and at least two motor ports in each portion of the tracing valve with the movable valve member as the valve member moves through its operating range. Preferably, this is accomplished by providing pairs of overlapped, staggered ports, each pair comprising a motor port and an operating port. One valve, or valve portion, causes one slide motor, sequentially, to run in one direction, stop, run in the other direction, stop, and run in said one direction as the valve member thereof moves through its operating range. The other valve, or valve portion, which has a movable valve member movable simultaneously with the first valve member, causes the other slide motor, sequentially, to stop, run in one direction, stop, run in the other direction and stop as the valve member moves through its operating range. Both sides of both motors are connected to the tracing valve and both motors are reversible by the valve as the valve member moves through its operating range. With each valve member portion capable of effecting four changes of operating condition of a slide motor as the valve member moves from one end of its operating range to the other, and with each valve member portion capable of producing reversible operation of each slide motor, full 360 degree tracing is possible.

It is therefore one object of the present invention to provide an improved machine tracing system, and mechanism therefor, of the type in which the direction of a cutter relative to a workpiece, is determined by the extent of deflection of a tracer valve stylus by a pattern. It is another object of the present invention to provide a tracing system, and mechanism therefor, of this type capable of automatic tracing through 360 degrees. It is yet another object of the present invention to provide a valve, or valve portion, capable of effecting four changes in the operating condition of a hydraulic motor connected thereto as the valve member thereof moves from one end of its operating range to the other end thereof. It is still another object of the present invention to provide a tracing valve operable to control two slide motors so that each motor undergoes four changes of operating conditions as the tracer valve member, or valve member portions, move from one end of an operating range to the other end thereof, and to operate the two motors in staggered relation.

Other objects and advantages of the present invention should be readily apparent by reference to the following specification, considered in conjunction with the accompanying drawings forming a part thereof, and it is to be understood than any modifications may be made in the exact structural details there shown and described, within the scope of the appended claims, without departing from or exceeding the spirit of the invention.

In the drawings:

FIG. 5 is a chart showing the position of the valve member and stylus, the movement of the slides, and the relative movement of the stylus and tool to the pattern and work, respectively, when the stylus is deflected different amounts by the pattern;

Figure 1:
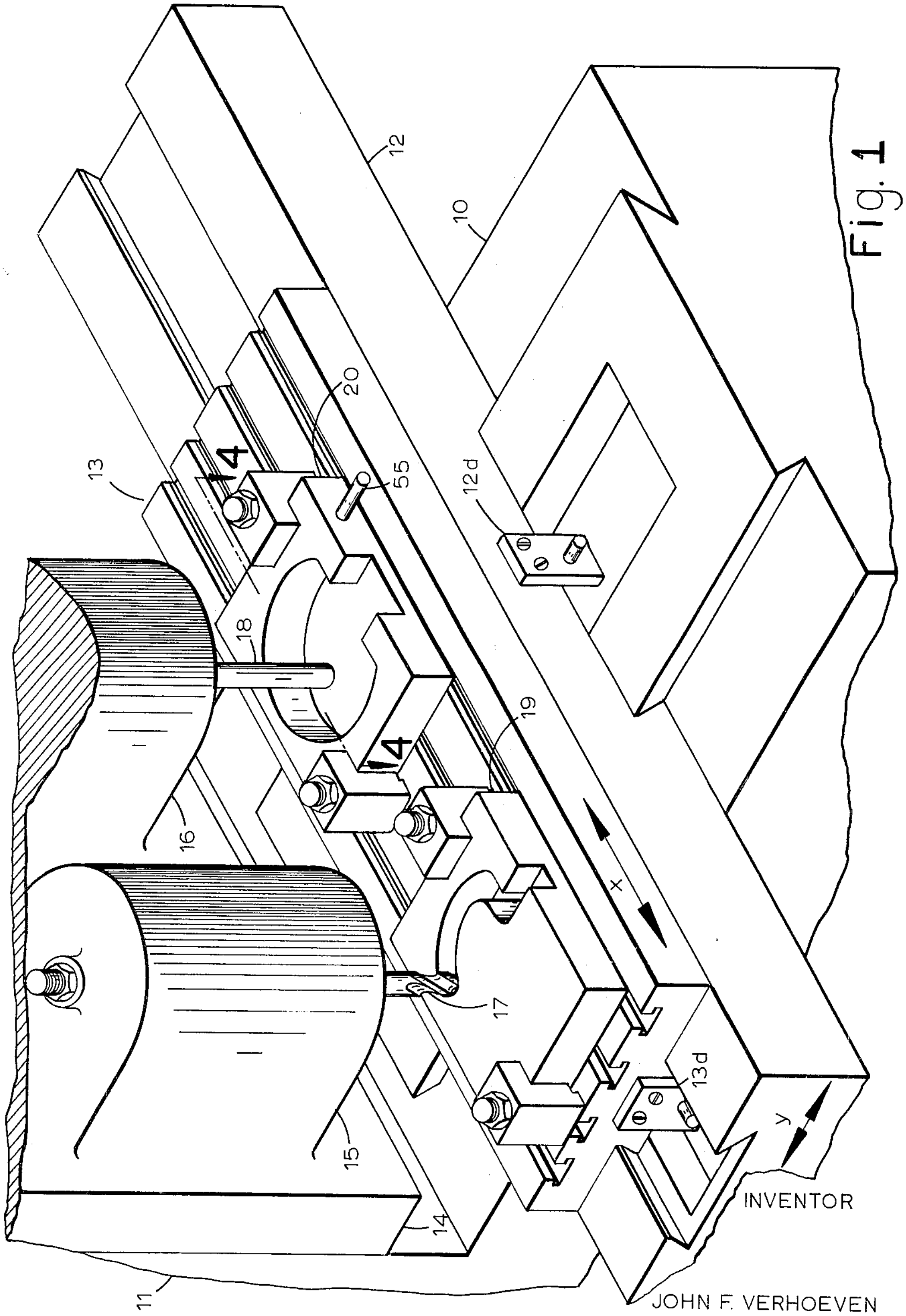
FIG. 1 shows, in perspective, a machine tool incorporating the present invention.

There is shown in FIG. 1 a machine tool having a base 10 with an upstanding column 11. A slide, or saddle, 12 is mounted on the base for movement thereon towards and away from the column 11 (as indicated by arrow Y) by a motor YM. The motor YM has a cylinder **12*a* (see FIG. 2) mounted in the base 10 and has a piston 12*b* slidably received in the cylinder 12*a*. Piston rods 12*c* connected to and extending from both sides of the piston are connected, respectively, to opposite sides of slide 12 by brackets 12*d*. A slide, or table, 13 is mounted on saddle 12 for movement thereon (as indicated by arrow X) perpendicular to the direction of movement of saddle 12 by a motor XM. The motor XM has a cylinder 13*a* (see FIG. 2) mounted in the saddle 12 and has a piston 13*b* slidably received in the cylinder 13*a*. Piston rods 13*c* connected to and extending from both sides of the piston are connected, respectively, to opposite ends of table 13 by brackets 13*d*. A support 14 is vertically adjustable on column 11, but is clamped in a fixed position thereon during operation of the machine. The support 14 has a tool housing 15 and a tracer valve housing 16 thereon. A tool 17, rotated by a motor (not shown) in support 14, extends downwardly from tool housing 15, and the stylus 18 of a tracing valve 25 (see FIG. 2) extends downwardly from tracer valve housing 16. A workpiece 19 and a pattern 20 are clamped to table 13 for engagement, respectively, by the cutter 17 and the stylus 18**.

With this construction, and with reversible coordinated operation of motors XM and YM, the table 13, and hence the workpiece 19 and pattern 20, can be made to move, in rectilinear translation, in any direction in a horizontal plane parallel to the plane of the table 13. Since both the tool housing 15 and the tracer valve housing 16 are fixed during operation of the machine, the reversible coordinated operation of motors XM and YM can produce universal relative movement in a plane between the stylus 18 and the pattern 20 and the same relative movement between the cutter 17 and the workpiece 19. It will be noted that other mounting arrangements can be used to produce the same relative universal movement in a plane. For example, the cutter housing 15 and tracer valve housing 16 can be mounted on one motor-driven slide and the workpiece 19 and pattern 20 can be mounted on another motor-driven slide movable transversely to the slide on which the workpiece and pattern are mounted. Or the cutter housing 15 and tracer housing 16 can be mounted on the upper slide of a pair of compound slides (as the workpiece and pattern of FIG. 1) with the workpiece and pattern mounted in a fixed position during tracing (as the cutter housing 15 and tracer valve housing 16 in FIG. 1.)

Figures 2, 3:
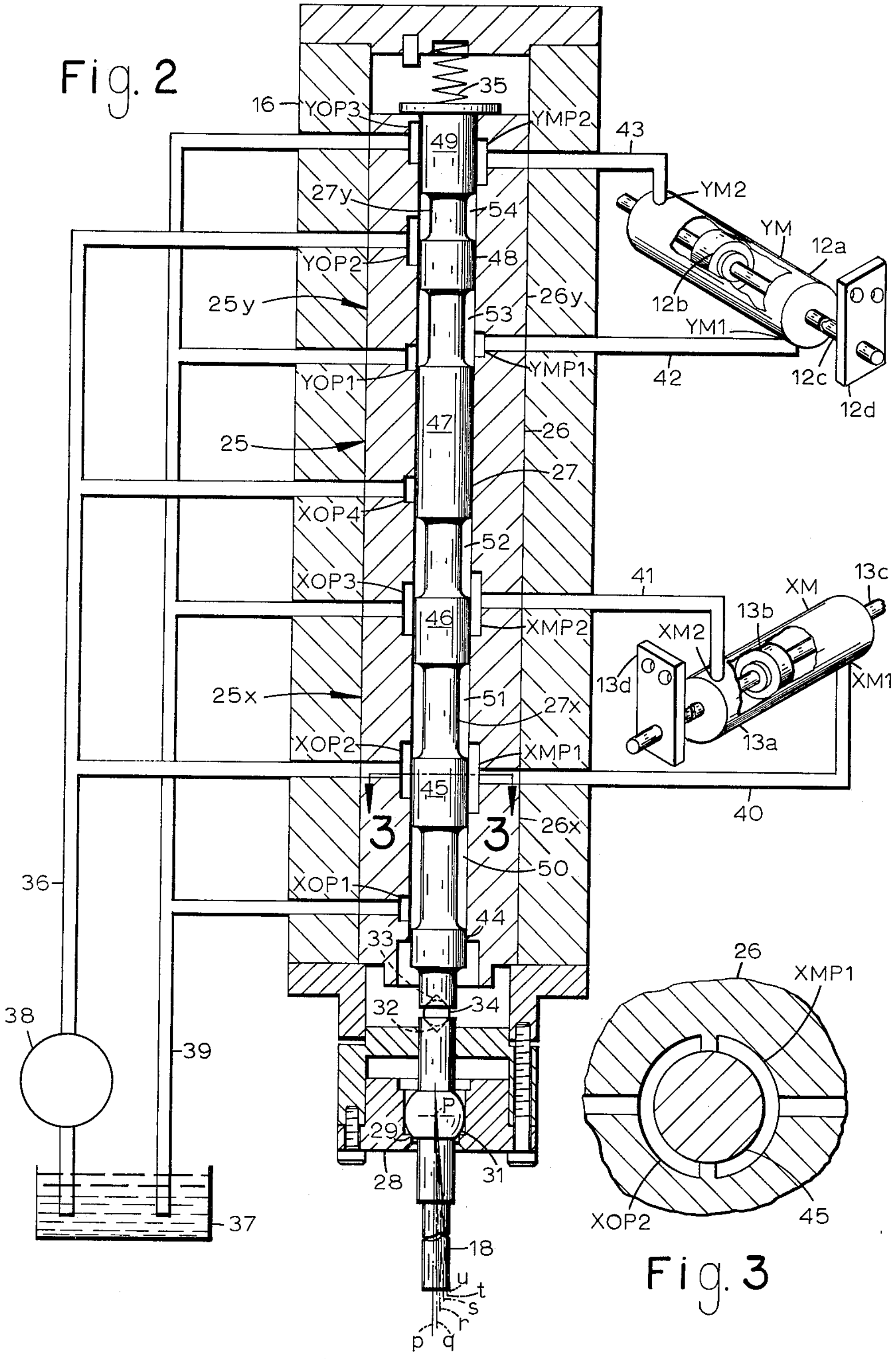
FIG. 2 is an enlarged view of the tracer valve of the machine tool of FIG. 1, with the hydraulic tracing system including the slide motors shown in schematic form.
FIG. 3 is a view taken on the line 3—3 of FIG. 2.

As shown in FIG. 2 the two motors YM and XM are connected to the tracer valve 25 mounted in tracer valve housing 16. The tracer valve has a valve sleeve bushing 26 tightly secured in housing 16 and a valve member 27 slidably received in valve bushing 26. The tracer valve may be considered as having two valve portions, 25*x* and 25*y*, each connected to both sides of one of the hydraulic slide motors to control the operation thereof. The valve portion 25*x*, which comprises valve bushing portion 26*x* and movable valve member portion 27*x*, controls motor XM, and the valve portion 25*y*, which comprises valve bushing portion 26*y* and movable valve member portion 27*y*, controls motor YM. A stylus socket 28 is secured in the lower end of housing 16 and has a shoulder 29 therein. The stylus 18 extends through socket 28 and has a spherical bead 31 thereon received in the socket and supported by the shoulder 29 to permit the stylus to pivot about point P. The stylus has a conical seat 32 at its upper end and the valve member 27 has a similar conical seat 33 at its lower end. Connection between the stylus and the valve member 27 is effected by a ball 34 received in both conical seats 32 and 33. A spring 35, interposed under compression between the housing 16 and the upper end of valve member 27, continuously urges valve member 27 downwardly and serves, through the two conical seats 33 and 32 and ball 34, to urge, or bias, the stylus 18 into a vertical position (indicated at *p* in FIG. 2) in alignment with valve member 27. When the stylus is in this vertical, or hang free, position *p*, the movable valve member 27 is in its lowermost position in the tracing valve. When the lower end of the stylus 18 is deflected to tilt the stylus from the vertical position, as by engagement with pattern 20, the stylus pivots, against the bias of spring 35, about pivot point P. The pivotal movement of the stylus raises the valve member 27 through ball 34, the extent of deflection of the stylus determining the amount of pivotal movement thereof and hence determining the extent of the upward axial movement of valve member 27. With the stylus 18 and valve member 27 connected by a ball received in conical seats in the stylus and valve member, it will be noted that a given deflection of the stylus will produce a given axial movement of the valve member regardless of the direction of tilt of the stylus. In other words, it is the extent to which the stylus is deflected at any instant, and not the direction in which the stylus is deflected, which determines the axial position of the valve member 27 in the tracing valve 25 at any instant.

Each of the valve portions 25*x* and 25*y* has a set of operating ports in the valve bushing portions 26*x* and 26*y*, respectively. The valve portion 25*x* has operating ports XOP1, XOP2, XOP3, and XOP4 and the valve portion 25*y* has operating ports YOP1, YOP2, and YOP3. Each of the valve portions 25*x* and 25*y* also has a set of motor ports in the valve bushing portions 26*x* and 26*y*, respectively. The valve portion 25*x* has motor ports XMP1 and XMP2 and the valve portion 25*y* has motor ports YMP1 and YMP2. All of the ports in valve bushing 26 consist of internal arcuate grooves extending less than 180 degrees around the inside of the valve bushing, as shown in FIG. 3. The operating port XOP2 and motor port XMP1 are axially positioned in bushing 26, on opposite sides of the valve member 27, to intersect a common horizontal plane and can thus be described as overlapping ports. However, one edge of motor port XMP1 (the lower edge) is axially spaced from the corresponding (lower) edge of operating port XOP2 so that the two ports can be described as staggered. Thus the motor port XMP1 and operating port XOP2 define a pair of staggered overlapping ports in valve portion 25*x*. Similarly, operating port XOP3 and motor port XMP2 define another pair of staggered overlapping ports in valve portion 25*x*. Operating port YOP1 and motor port YMP1 define a first pair of staggered overlapping ports in valve portion 25*y*, and operating port YOP3 and motor port YMP2 define a second pair of staggered overlapping ports in valve portion 25*y*.

A pressure line 36 receives hydraulic fluid supplied thereto from sump 37 by pump 38, and a return line 39 returns fluid to the sump to define two complementary operating lines. Two operating ports XOP2 and XOP4 of valve portion 25*x* are connected to pressure line 36, and one operating port YOP2 of valve portion 25*y* is connected to pressure line 36. Two operating ports XOP1 and XOP3 of valve portion 25*x* are connected to return line 39, and two operating ports YOP1 and YOP3 of valve portion 25*y* are connected to the return line 39. Both sides of both motors XM and YM are connected to motor ports of the tracer valve, motor XM to valve portion 25*x* and motor YM to valve portion 25*y*. Side XM1 of motor XM is connected to motor port XMP1 through motor line 40 and side XM2 of motor XM is connected to motor port XMP2 through motor line 41. Slide YM1 of motor YM is connected to motor port YMP1 through line 42 and side YM2 of motor YM is connected to motor port YMP2 through motor line 43.

The valve member 27 has a plurality of spools which are spaced apart to define annular channels there between. Four spools 44, 45, 46, 47 cooperate with and control the ports of valve portion 25*x* and three spools 47, 48, 49 cooperate with and control the ports of valve portion 25*y*. Spools 44, 45, 46, 47 define annular channels 50, 51, and 52 in the valve member portion 25*x* and spools 47, 48, 49 define annular channels 53 and 54 in the valve member portion 25*y*. It will be noted the spool 47 bridging valve portions 25*x* and 25*y* controls ports in both valve portions. Separate spools could be used in lieu of the single spool 47, but since the valve member portions 27*x* and 27*y* are connected for axial movement in unison in response to deflection of stylus 18, the single spool 47 can be used for control of ports in both valve portions. The valve member 27 (and hence portions 27*x* and 27*y*) has an operating range of axial movement, the valve member being at the lowest end of the operating range when the stylus 18 is in a slightly deflected position (at one extreme end of a predetermined zone of deflection of the stylus), as indicated at *q* in FIG. 2, and valve member 27 is at the highest end of the operating range when the stylus 18 is more extensively deflected (at the opposite extreme end of a predetermined zone of deflection of the stylus), as indicated at *u* in FIG. 2. Although the stylus can assume an undeflected position *p* beyond the inner end of the zone of deflection, or a deflected position beyond the outer end of the zone of deflection (thus positioning the valve member 27 below or above, respectively, the operating range), the stylus 18 will remain within the zone of deflection, and valve member 27 will remain within the operating range, after the stylus has engaged the pattern in automatic tracing, assuming the pattern does not have an edge to be traced which turns through more than 360 degrees from one end of the tracing path to the other. In other words, the operating range is the range in which the valve member 27 is effective in controlling the motor ports and operating ports of the valve during automatic tracing, and the zone of deflection of the stylus is the zone through which the stylus is deflected to effect movement of the valve member 27 through the operating range.

Figures 6, 7, 8, 9, 10:
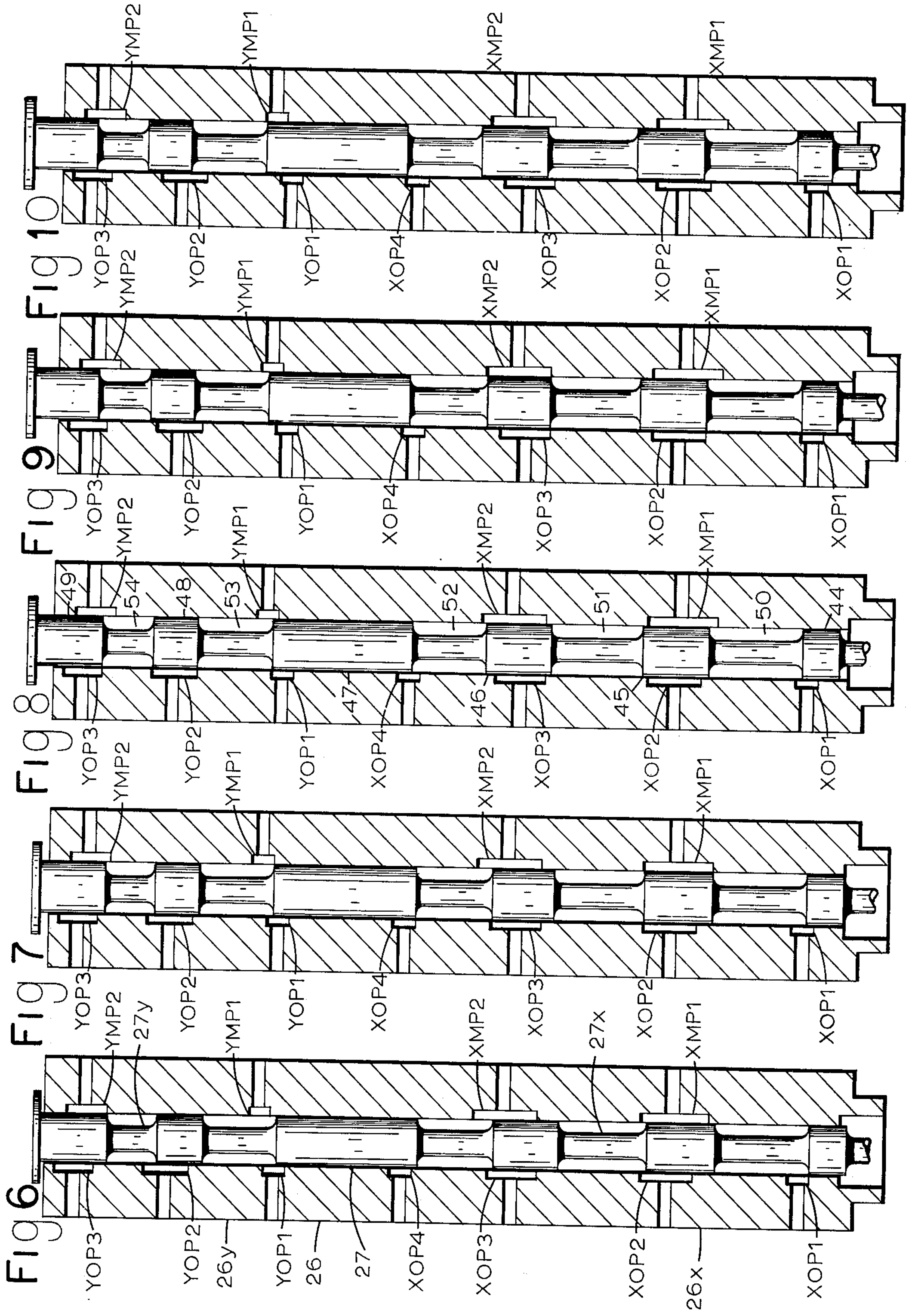
FIGS. 6, 7, 8, 9, 10 show the position of the movable valve member relative to the tracer valve ports at different positions of the valve member in the operating range, the difference in position of the valve member in the different figures being exaggerated for clarity.

Some of the positions of the valve member 27 as it moves through its operating range in response to different amounts of deflection of the stylus are shown in FIGS. 6, 7, 8, 9, and 10. An intermediate, or central, position of the valve member 27 is shown in FIG. 8 and is referred to, for convenience, as the central, or null, position. The valve member 27 assumes the null position when the stylus is deflected to an intermediate position $s$ in the zone of deflection as shown in FIG. 2. A slightly greater deflection of the stylus, as indicated at $t$ in FIG. 2, positions valve member 27 as shown in FIG. 9 which, for convenience, is referred to as an over deflected position. Even greater deflection of stylus 18, as indicated at $u$ in FIG. 2, causes the valve member 27 to assume the positions shown in FIG. 10, which is the upper end of the operating range and is referred to herein as the over over deflected position. Deflection of the stylus to positions indicated at $r$ and $q$ in FIG. 2 causes the valve member to assume the positions shown, respectively, in FIG. 7 and FIG. 6, which are referred to herein, respectively, as under deflected and under under deflected positions. The difference between positions of the valve member in FIGS. 6, 7, 8, 9, and 10 has been exaggerated for clarity. In an actual valve, the movement of the valve member 27 would be, for example, .005 inch between adjacent positions of those illustrated so the total movement of the valve member 27 as it moved from one end of the operating range to the other would be, for example, .020 inch.

The spools are positioned relative to both the set of motor ports and the set of operating ports in each valve portion 25$x$ and 25$y$ to control both sets of ports as the valve member 27 (and valve member portions 27$x$ and 27$y$) move through the operating range. When a port is controlled, the port is blocked at least once and exposed at least once (that is, exposed for communication with another port) as the valve member moves through the operating range. Specifically, the unstaggered ports XOP1, XOP4, and YOP2 are each controlled by a spool, the port XOP1 by spool 44, the port XOP4 by spool 47, and the port YOP2 by spool 48. Each of these ports, during movement of valve member 27 through the operating range, is either blocked by the spool which controls it, and hence isolated from other ports (see, for example, port YOP2 in FIG. 8), or exposed by the spool which controls it but nevertheless isolated from other ports by another spool (see, for example port YOP2 in FIG. 6), or exposed by the spool which controls it for communication with another port (see, for example, port YOP2 in FIG. 7). Each pair of staggered ports is controlled by a single spool. The pair YOP3, YMP2 is controlled by spool 49; the pair YOP1, YMP1 is controlled by spool 47; the pair XOP3, XMP2 is controlled by spool 46; and the pair XOP2, XMP1 is controlled by spool 45. The ports of each of these pairs of staggered ports, as the valve member 27 moves through the operating range, are either both blocked by the spool which controls the pair so that both ports are isolated from other ports (see, for example, ports YOP1 and YMP1 in FIG. 10); are both exposed for communication with each other (see, for example, ports YOP1, YMP1 in FIG. 6 or 7); or one port is blocked and one port is exposed, the exposed port either being isolated from other ports (as YMP1 in FIG. 8) or the exposed port being in communication with another port (as YMP1 in FIG. 9). By controlling the motor ports and the operating ports in each valve portion, each motor is capable of four changes of operating condition (that is, each motor changes from stop to run or from run to stop four times) if the valve member is moved from one end of the operating range to the other, and each motor is capable of reversible operation. The two valve portions are not similar, because the valve must be able to run the motors in staggered operation (that is, if one motor is stopped the other must be running). If the valve member is between any two adjacent positions shown in FIGS. 6, 7, 8, 9, and 10, both motors will be running, and axial movement of the valve member toward one or the other positions shown in FIGS. 6, 7, 8, 9, or 10 will cause one motor to speed up and the other motor to slow down. It is the relative speed of the two motors which determines the direction of relative movement between the tracer valve housing (and the stylus carried thereby) and the pattern and between the cutter and the workpiece.

As the valve member 27 moves through its operating range, and the operation of the motors are controlled in staggered relation, each changing its operating condition four times, the slides can be operated to effect relative movement between the stylus and pattern (and cutter and workpiece) in any direction within a 360 degree range.

Prior to beginning a tracer operation, support 14 will be clamped to column 11 at a position where tool 17 will be at the proper height for the desired cut in workpiece 19. The table 12 will be positioned relative to support 14 so that the tool 17 is in front of the workpiece (that is, on the side of the workpiece away from column 11) and the stylus will be in front of the pattern (as indicated at 18$a$ in FIG. 4). The stylus will be in the vertical (hang free) position, as indicated at $p$ in FIG. 2, and the valve member will be in the position shown in FIG. 2. It will be noted that although one motor port (YMP1) is in communication with one operating port (YOP1), the motor YM will not operate when pump 38 is turned on because the other motor port YMP2 is blocked by spool 49. Thus slide 12 will remain stationary on base 10, and this zero movement is indicated by 0 in column D, line 10, of the chart of FIG. 5. Motor XM will operate, however, to move slide 13 to the left as viewed in FIG. 1 (column C, line 10, FIG. 5), since motor port XMP1 is connected, through channel 51 and operating port XOP2, to pressure line 36, and motor port XMP2 is connected, through channel 52 and operating port XOP3, to return line 39. With motor YM stopped, and motor XM moving the slide 13 to the left as viewed in FIG. 1, the relative movement of the stylus with respect to the pattern is to the right as indicated by arrow $a$ in FIG. 4, and as shown in column H, line 10 of the chart of FIG. 5.

In any system utilizing a stylus-operated tracer valve, it is necessary to distinguish between bodily movement of the stylus and valve member with the tracer valve housing, and movement of the stylus and valve member relative to the tracer valve housing. With respect to the stylus, this latter type of movement may, for convenience, be referred to as deflection of the stylus to distinguish from bodily movement of the stylus. With respect to valve member 27, or valve member portions 27$x$, 27$y$, this latter type of movement constitutes axial movement, or displacement, of the valve member 27 in the bushing 26 and any reference herein to movement of valve member 27 refers to this axial movement. In a tracer system utilizing a tracer valve in which the extent of deflection of the stylus determines the relative direction of movement between the stylus-operated valve and the pattern (and hence between the cutting tool and the work), the axial movement of the valve member is always directly related to the deflection of the stylus. In other words, the valve member is displaced only in response to deflection of the stylus and, at any given instant, the axial position of the valve member is determined solely by the extent of deflection of the stylus. In this type of system, the deflection of the stylus determines the position of the valve member which, in turn, determines the direction of movement of the tracer valve housing (and stylus) relative to the pattern. But movement of the tracer valve housing relative to the pattern determines the deflection of the stylus so that there is a continuous feedback which maintains the stylus in engagement with the pattern.

Figure 4:
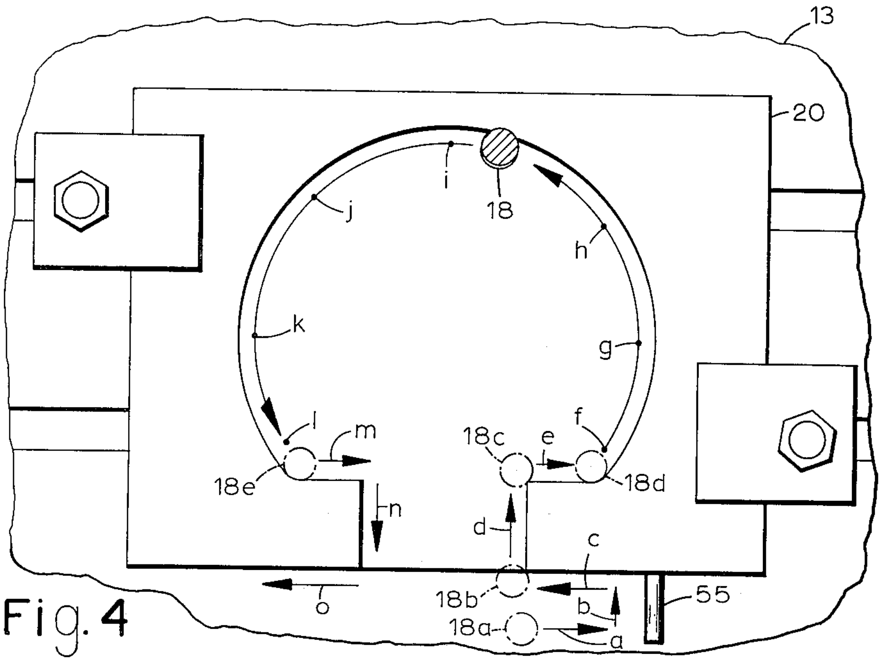
FIG. 4 is a view taken on the line 4—4 of FIG. 1.

In order to guide the stylus into the pattern (and hence move the cutter 17 into the workpiece) the stylus may be deflected by the operator, or, a guide rod 55 may be screwed into the pattern to extend into the path of the stylus as it moves along the path indicated by arrow $a$ in FIG. 4. Engagement of stylus 18 with guide rod 55 will deflect the stylus 18, and the deflection will increase until the valve member 27 is moved to a position where the motors operated thereby run the slides in a direction to stop the increasing deflection. When the motors change their operating conditions to an extent to effect movement of the tracer valve housing and stylus parallel to guide rod 55, the increase of deflection of the stylus will stop, and the stylus will be held in the deflected position which caused the motors to move the stylus parallel to the guide rod.

As can be seen best by the chart of FIG. 5, the motor XM will continue to run, increasing the deflection of the stylus and raising the valve member 27 in the valve bushing 26, until the stylus is at *r* (FIG. 2) and the valve member 27 is in the under deflected position (line 7 of FIG. 5) shown in FIG. 7. At this time, motor port XMP1 becomes blocked, stopping motor XM. At the same time, motor port YMP1 is in communication through channel 53 with operating port YOP1 which is connected to return line 39, and motor port YMP2 is in communication with operating port YOP2 which is connected to pressure line 36. Thus the motor YM is running to move slide 12 away from the column 11 to cause relative movement of stylus 18 as shown by arrow *b* in FIG. 4. Since the motor XM stopped when the stylus was deflected to the under deflected (*r*) position, the stylus will remain in this under deflected position as it moves parallel to the guide rod 55.

When the stylus 18 hits the front edge of the pattern, the stylus will be deflected beyond the position shown at *r* in FIG. 2 until the valve member compels the motors to produce relative movement between stylus 18 and the pattern parallel to the front edge of the pattern. This will occur when the stylus is deflected to the *s* position (see FIG. 2) and the valve member is in the null position shown in FIG. 8 (see line 5 of FIG. 5). Both motor ports leading to the motor YM are isolated so the motor YM is stopped, but both motor ports leading to motor XM are exposed for communication with operating ports so motor XM is running. It will be noted that each motor port leading to motor XM is connected to a different operating port than the operating ports they were connected to when the stylus was in a hang-free position and that motor XM is running in the opposite direction. Thus, the relative movement of the stylus to the pattern is as indicated by arrow *c* in FIG. 4.

As the stylus begins to leave the front edge of the pattern (as at 18*b*), it returns to the position shown at *r* in FIG. 2 under the bias of spring 35, and valve member 27 is again in the under deflected position (see line 7 of FIG. 5). Thus, the tracer runs as indicated by arrow *d* in FIG. 4. When the stylus reaches the position 18*c*, it drops to the position shown at *q* in FIG. 2 and the valve member 27 drops to the under under deflected position shown in FIG. 6 (see line 9 of FIG. 5). Since, at this position of the valve member, the spools on the valve member block and expose the same operating and motor ports as when the stylus is in the hang-free position, the stylus moves as indicated by arrow *e* in FIG. 4.

As the stylus moves counterclockwise from the position shown at 18*d* to the position shown at 18*e*, the deflection of the stylus is continuously increasing, raising the valve member 27 to operate the motors in a continuously changing manner to continuously change the direction of stylus and cutter movement relative to the pattern and the workpiece. At the point *f* in FIG. 4, the valve member is between the positions shown in FIGS. 6 and 7 and both motors are running (see line 8 of FIG. 5). As the stylus advances toward point *g* the motor XM slows down and motor YM speeds up, until, at point *g*, the valve member is in the under deflected position shown in FIG. 7 (see line 7 of FIG. 5) with motor XM stopped and motor YM operating at maximum speed. At point *h*, the stylus is between position *r* and *s*, the valve member is between the under deflected position of FIG. 7 and the null position of FIG. 8, and both motors are running as indicated in line 6 of FIG. 5. At *i*, the stylus is at position *s*, the valve member is in the null position of FIG. 8 to stop the motor YM and run the motor XM at its maximum operating speed (see line 5 of FIG. 5). At point *j*, the stylus, valve member, and operation of motors are as indicated in line 4 of FIG. 5. At point *k*, the valve member is in the over deflected position shown in FIG. 9. In this position of the valve member, motor port YMP1 is connected to operating port YOP2, which is connected to pressure line 36, and motor port YMP2 is connected to operating port YOP3 which is connected to return line 39. Both motor ports XMP1 and XMP2 are isolated from operating ports. Thus, only the motor YM is running (see line 3 of FIG. 5), as when the valve member was in the under deflected position of FIG. 7, but it is running in the opposite direction than it was in the under deflected position. When the stylus is at point 1, both motors are running as indicated in line 2 of FIG. 5, but when the stylus treaches the position 18*e*, it hits the surface running parallel to the front edge of the pattern and is deflected to the over over deflected position of FIG. 10 (see line 1 of FIG. 5). In this position of the valve member, motor port YMP1 is blocked so despite connection of motor port YMP2 to operating port YOP3, the motor YM is stopped. Motor port XMP2 is connected to operating port XOP3, which is connected to return line 39, and motor port XMP1 is connected to operating port XOP2, which is connected to pressure line 36. Since the motor ports of the XM motor are in communication with the same ports as when the valve member is in the under under deflected position, see FIG. 6), and motor YM is stopped as it was when the valve member was in the under under deflected position, the stylus will move in the same direction, indicated by arrow *m*, as when the valve member was under under deflected (see arrow *e*).

As the stylus leaves the surface extending parallel to the front edge, it drops to the position *t* of FIG. 2 and moves as indicated by arrow *n* (see line 3 of FIG. 5). As the stylus reaches the front of the pattern, it drops to the position *s* of FIG. 2 (as indicated in line 5 of FIG. 5), and the stylus moves as indicated by arrow *o* in FIG. 4, the tool 17 completing the pattern controlled cutting operation.

It will be noted from FIG. 2 that motor lines 40 and 41, connected to opposite sides of motor XM, define complementary lines, one line delivering fluid to the motor and one line delivering fluid from the motor, when the motor is running. Similarly, the motor lines 42 and 43, connected to opposite sides of motor YM, define complementary lines, one line delivering fluid to the motor and one line delivering fluid from the motor, when the motor is running. The pressure line 36 and return line 39 may also be considered a pair of complementary lines, the pressure line delivering fluid to the tracer valve 25 and the return line delivering fluid from the tracer valve, whenever either motor is running. Since the valve 25 serves only to block or permit flow between the operating lines 36, 39, and the motor lines 40, 41 and 42, 43, the lines can be reversed with respect to the valve without affecting the operation of the system. Specifically, the ports connected, in FIG. 2, to sides XM1 and YM1 of motors XM and YM could, instead, be connected to pressure line 36, and the ports connected to sides XM2 and YM2 of motors XM and YM could, instead, be connected to return line 39. The ports in valve portion 25*x* connected to the pressure line 36 in FIG. 2 would, instead, be connected to side XM1 of motor XM and the ports in valve portion 25*y* connected to pressure line 36 in FIG. 2 would, instead, be connected to side YM1 of motor YM. The ports in valve portion 25*x* connected to the return line 39 in FIG. 2 would, instead, be connected to side XM2 of motor XM and the ports in valve portion 25*y* connected to the return line 39 in FIG. 2 would, instead be connected to side YM2 of motor YM. If this is done, the tracing system will operate in the same manner as described for the connection shown in FIG. 2. In other words, valve portion 25*x* is shown, in FIG. 2, as having two motor ports and four operating ports to achieve four changes of operating condition of motor XM and reversible operation thereof, but the same results can be achieved with four motor ports and two operating ports. Similarly, valve portion 25*y* is shown, in FIG. 2, with two motor ports and three operating ports to achieve four changes of operating condition of motor YM and reversible operation thereof, but the same results can be achieved with three motor ports and two operating ports.

Figure 11:
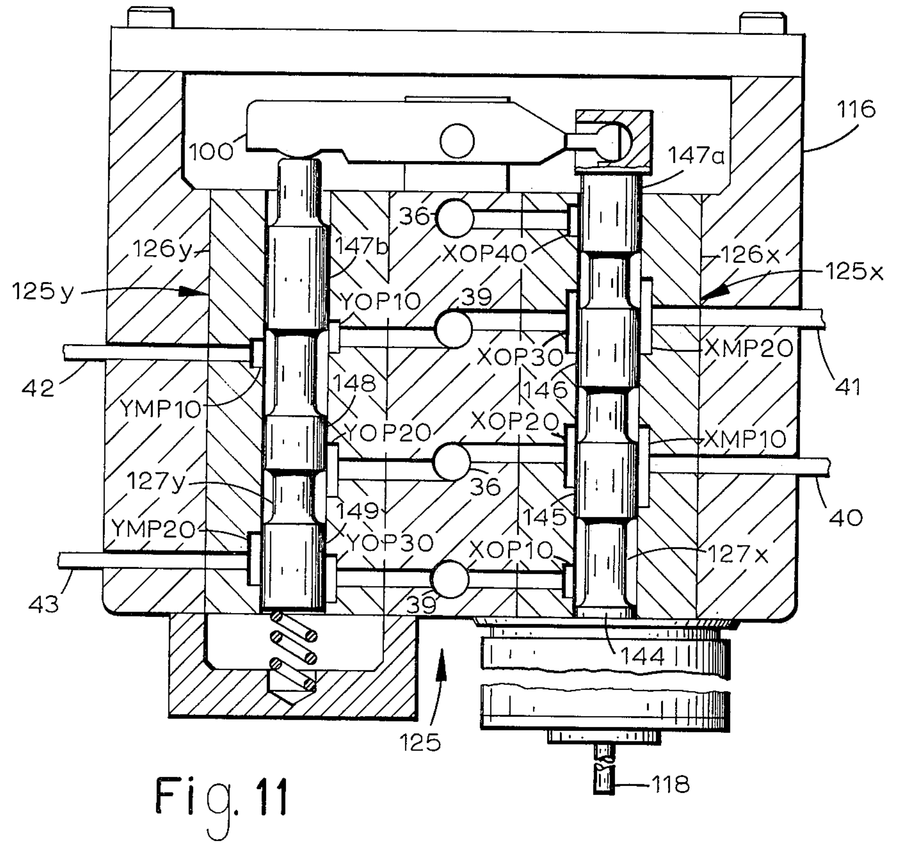
FIG. 11 is a cross-sectional view through a different embodiment of the tracer valve.

The tracing valve 125 of FIG. 11 will, if substituted for the tracing valve 25 of FIG. 2, operate to change the operating condition of each of two motors connected thereto four times, and produce reversible operation of both motors, as the stylus 118 thereof is deflected through a zone of deflection. The valve 125 has two valve portions, valve portion **125*x* and valve portion 125*y*. Valve portion 125*x* has a sleeve bushing portion 126*x* tightly secured in a housing 116 mounted on support 14 in place of housing 16. The sleeve bushing portion 126*x* has two motor ports XMP10 and XMP20, and four operating ports XOP10, XOP20, XOP30, and XOP40. Valve portion 125*y* has a sleeve bushing portion 126*y* (also, tightly secured in housing 116) with two motor ports YMP10 and YMP20, and three operating ports YOP10, YOP20, and YOP30. The valve 125 has a valve member comprising two portions, portion 127*x* (having spools 144, 145, 146, and 147*a*) connected to the stylus 118 in the same manner as valve member 27 is connected to stylus 18, and portion 127*y* (having spools 147*b*, 148, and 149) connected to valve member portion 127*x* through a pivotal arm 100. As in the valve 25 of FIG. 2, both valve portions move in unison in response to change in deflection of the stylus and the position of each valve member portion, at any instant, is determined solely by the extent of deflection of stylus 118. However, unlike the valve 25 of FIG. 2, the valve member portions 127*x* and 127*y*** move in opposite directions.

In FIG. 11, the stylus 118 is shown in a vertical hang-free position. A comparison of FIG. 11 and FIG. 2 will show that the valve member portion **127*x* is similar to valve member portion 27*x* and bears the same relation to the motor ports and operating ports. A comparison of valve portion 125*y* to valve portion 25*y* will show that valve portion 125*y* is similar to, but upside down, relative to the showing of FIG. 2. The upside down relationship is due to the fact that valve portion 127*y* moves down as the deflection of the stylus 118 increases, instead of up as the valve portion 27*y* of valve 25. The motor and operating ports are positioned relative to the valve member 127*y* (in view of the direction of movement of this valve member) in the same relationship as the motor and operating ports of valve portion 25*y* to valve member 27*y* thereof. The tracing valve 125 operates in the same manner as tracing valve 25 when motor ports XMP10 and XMP20 are connected to motor lines 40, 41, respectively; when motor ports YMP10 and YMP20 are connected to motor lines 42, 43, respectively; when operating ports XOP20, XOP40, and YOP20 are connected to pressure line 36; and operating port XOP10, XOP30, YOP10, and YOP30 are connected to return line 39**.

Figures 12, 13:
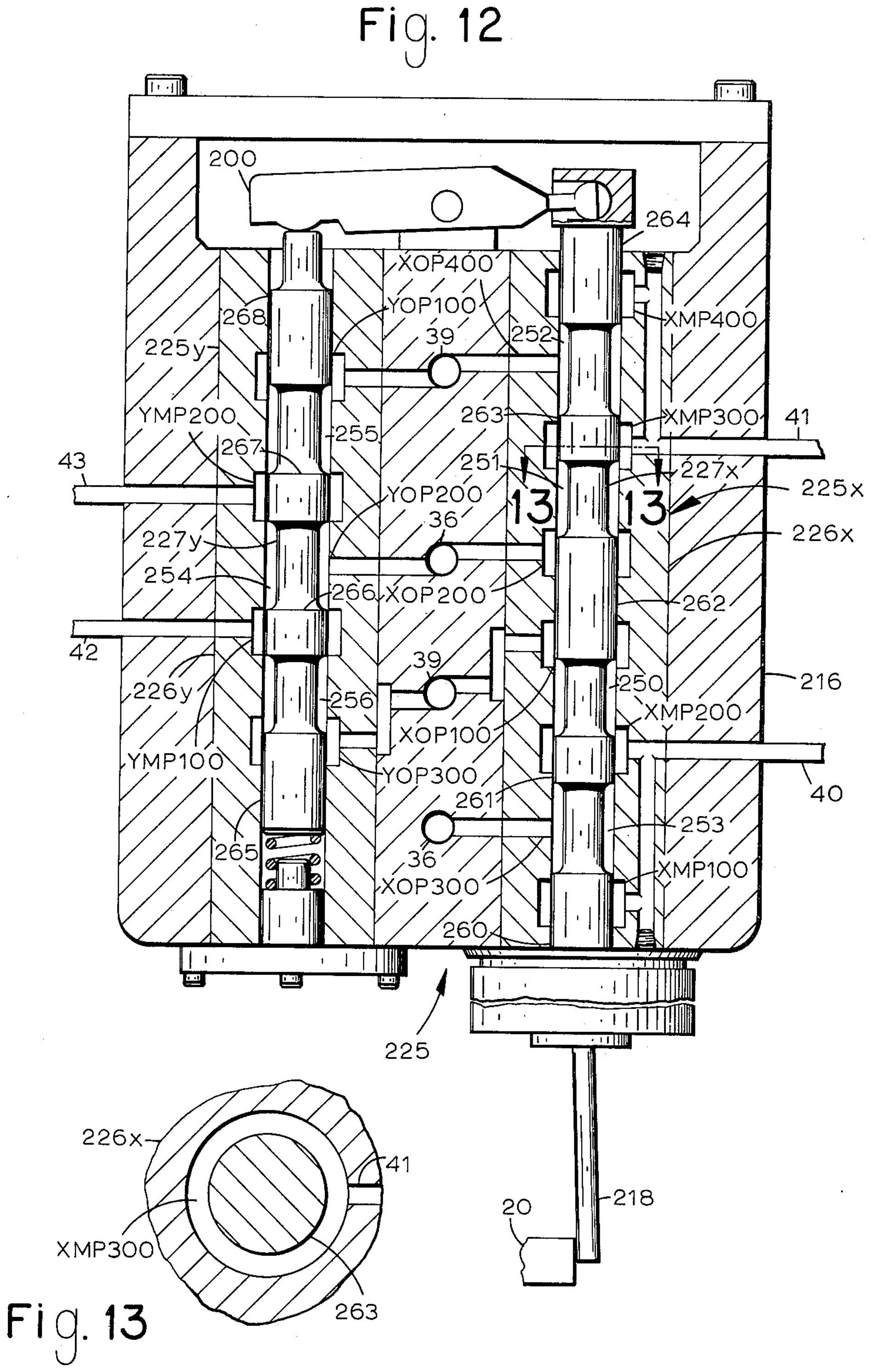
FIG. 12 is a cross-sectional view through yet another embodiment of the tracer valve.
FIG. 13 is a view taken on the line 13—13 of FIG. 12.

There is shown in FIG. 12 another embodiment of a stylus-operated tracer valve 225 which, like the previous embodiments described, consists of two valve portions (**225*x* and 225*y*) having, respectively, movable valve member portions (227*x* and 227*y*) connected together (through pivot link 200) and movable in unison in response to change in the extent of deflection of a tracer valve stylus 218 which is connected to valve member portion 227*x* in the same manner as stylus 18 is connected to valve member portion 27*x*. The valve member portions 227*x* and 227*y* are slidably received, respectively, in valve bushing portions 226*x* and 226*y* which are tightly secured in a housing 216 fixed to support 14 in place of housing 16. Valve member portion 227*x* has spaced spools 260, 261, 262, 263, and 264 defining annular valve member passages therebetween, and valve member portion 227*y* has spaced spools 265, 266, 267, and 268 also defining annular valve member passages therebetween. Valve portion 225*x* has two controlled operating ports, XOP100 connected to return line 39 and XOP200 connected to pressure line 36. Valve portion 225*x* also has two uncontrolled operating ports (that is, ports which are never blocked), port XOP300 connected to pressure line 36 and port XOP400 connected to return line 39. Valve portion 225*x* also has four controlled motor ports, ports XMP100 and XMP200 connected to line 40 which is connected to side XM1 of motor XM, and ports XMP300 and XMP400 connected to line 41 which is connected to side XM2 of motor XM**.

An examination of FIG. 12 in conjunction with column C of FIG. 5 will reveal that valve portion **225*x* controls motor XM in the same manner as valve portion 25*x*. When the stylus 218 is deflected to the position shown, intermediate the limits of the zone of deflection, the valve member portion 227*x* will be in a centered position with respect to its operating range, as shown. At this time, side XM1 of motor XM will be connected to return line 39 (through line 40, motor port XMP200, annular valve member passage 250, and operating port XOP100), and side XM2 of motor XM will be connected to pressure line 36 (through line 41, motor port XMP300, annular valve member passage 251, and operating port XOP200). With side XM1 of motor XM connected to the return line and side XM2 connected to the pressure line, the slide 13 will be moved to the right as viewed in FIG. 4, and as indicated in line 5, column C of FIG. 5. As the extent of deflection of stylus 218 increases, valve member portion 227*x* rises to an over deflected position, blocking motor port XMP200 and isolating motor port XMP300 from any operating port to isolate both sides of motor XM from the operating lines and stopping the motor (see line 3, column C, FIG. 5). As the extent of deflection of stylus 218 increases further to an over over deflected position, side XM2 of motor XM becomes connected to return line 39 (through line 41, motor port XMP400, annular valve member passage 252, and operating port XOP400). At the same time, side XM1 of motor XM becomes connected to pressure line 36 (through line 40, motor port XMP200, annular valve member passage 253, and operating port XOP300). Since the sides of the motor XM are connected to the complementary operating lines in reverse order to the connection thereof when the valve member 227*x* was in the centered position, the slide connected to the motor XM will move in the opposite direction as indicated in line 1, column C, FIG. 5. When the extent of deflection of stylus 218 is less than that shown in FIG. 12, and the valve member 227*x* drops to an under deflected position, both sides of the motor will become isolated from operating lines and the motor will stop (see line 7, column C, FIG. 5). As the extent of deflection of the stylus decreases, the valve member 227*x* drops to an under under deflected position where side XM1 of the motor XM is connected to pressure line 36 (through line 40, motor port XMP100, annular valve member passage 253, and operating port XOP300), and side XM2 of motor XM is connected to return line 39 (through line 41, motor port XMP300, annular valve member passage 252, and operating port XOP400). With these connections, the motor runs in the same direction as when valve member 227*x* was in the over over deflected position (see lines 1 and 9**, column C, FIG. 5).

Valve portion **225*y* has two controlled motor ports, port YMP100 connected to line 42 which is connected to side YM1 of motor YM and port YMP200 connected to line 43 which is connected to side YM2 of motor YM. Valve portion 225*y* has two controlled operating ports YOP100 and YOP300, both connected to return line 39**.

Valve portion 225y also has an uncontrolled operating port YOP200 connected to pressure line 36.

An examination of FIG. 12 in conjunction with column D of FIG. 5 will show that valve portion 225y controls motor YM in the same manner as valve portion 25. When stylus 218 is in the position shown, movable valve member portion 227y is in a centered position with respect to its operating range, as shown, and both motor ports YMP100 and YMP200 are blocked to stop motor YM (see line 5, column D, of FIG. 5). As the extent of deflection of stylus 218 increases, valve member portion 227y moves down to an over deflected position where side YM1 of motor YM is connected to pressure line 36 (through line 42, motor port YMP100, annular valve member passage 254, and operating port YOP200) and side YM2 of motor YM is connected to return line 39 (through line 43, motor port YMP200, annular valve member passage 255, and operating port YOP100). With these connections, the motor will run as indicated in line 3, column D, of FIG. 5. When the stylus is deflected to a greater extent, and valve member portion 227y moves down to an over over-deflected position, spool 268 blocks operating port YOP100 so that port YMP200 is isolated from any operating port and side YM2 of motor YM is blocked, thereby stopping the motor despite connection of side YM1 thereof to the pressure line (see line 1, column D, of FIG. 5). When the stylus is deflected to a lesser extent than shown in FIG. 12, valve member portion 227y is raised to an under deflected position to connect side YM1 of the motor to return line 39 (through line 42, operating port YMP100, annular valve member passage 256, and operating port YOP300), and to connect side YM2 of the motor YM to pressure line 36 (through line 43, motor port YMP200, annular valve member passage 254, and operating port YOP200). With these connections, motor YM will run in the opposite direction it ran when the valve member 227y was in the over deflected position (see line 7, column D, of FIG. 5). When the stylus 218 is deflected even less, the valve member 227y raises to an under-deflected position where spool 265 blocks operating port YOP300 and isolates side YM1 of motor YM from any operating port, thereby stopping the motor despite connection of side YM2 to pressure line 36 (see line 9, column D, of FIG. 5).

It will be noted that the upper half of valve portion 225x controls one side of motor XM (side XM2) and the lower half of valve portion 225x controls the other side of motor XM (side XM1). Since each of the operating ports supplies hydraulic fluid to, or takes hydraulic fluid from, one side of the motor only, the valve portion 225x can be divided as long as the movable valve member is connected to the stylus and moves in response to the extent of deflection of the stylus. Consequently, the upper half of valve portion 225x can be turned upside down and the two halves of valve member portion 227x connected by a pivotal link, in the same manner as valve member portion 227y is connected, without affecting the operation of the tracer valve. If this were done, the lower half of valve member portion 227x would remain connected to the stylus 218, and both the upper half of valve member portion 227x and the valve member portion 227y would be connected to the lower half of valve member portion 227x through pivotal links, and all parts of all valve member portions would be connected together and connected to the stylus for movement in unison in response to change in the extent of deflection of the stylus.

The valve member 225, as the valve members of FIG. 2 and FIG. 11, operates two motors in staggered relation and effects four changes of operating condition of each motor as the valve member portions move through their operating ranges and effects reversible operation of both motors. In each valve portion 225x and 225y of FIG. 12, at least two motor ports and at least two operating ports are controlled by each movable valve member portion as it moves through its operating range. The tracer valve 225, although having more spools than the other tracer valves described, requires no overlapped ports, and hence, each controlled port can extend completely around the inner surface of the valve bushing portions 226x and 226y, as illustrated in FIG. 13. The larger ports of the tracer valve 225 of FIG. 12 permit more oil flow to and from the hydraulic slide motors for any given axial increment of movement of the valve member portions 227x and 227y. This larger oil flow is advantageous in large machines where the large motors required to move the slides require a large volume of oil for operation.

What is claimed is:

1. A hydraulic tracing valve having a set of motor ports for connection to opposite sides of a single hydraulic motor and having a set of operating ports for connection to a pressure and return line, one of said sets having three ports and the other set having two ports, said valve member having a plurality of spaced lands operable to block a port when in full registration therewith, said lands spaced to block all of the ports of said one set of ports when the valve member is in a centered position and to expose two ports of said one set to two ports of the other set of ports when the valve member is moved from the centered position toward either end of the operating range, one of said lands blocking one of the ports of the other set of ports as the valve member moves to one end of the operating range and another of said lands blocking the other port of said other set of ports as the valve member moves to the other end of the operating range.

2. A hydraulic tracing valve having a pair of motor ports and having a set of operating ports for said motor ports, said valve having a valve member movable through a predetermined operating range, said valve member having a plurality of spaced lands operable to block a port when in full registration therewith, said lands spaced to block all of said operating ports when the valve member is in a centered position and to expose two of said operating ports to the motor ports when the valve member is moved from the centered position toward either end of the operating range, one of said lands blocking one of said motor ports as the valve member moves to one end of the operating range and another of said lands blocking the other of said motor ports as the valve member moves to the other end of the operating range.

3. A hydraulic tracing valve having a stylus and having three operatnig ports and two motor ports, said valve having a valve member movable through a predetermined operating range in response to change in the extent of deflection of the stylus, said valve member having three spaced spools each operable to block a port when in full registration therewith, each spool in full registration with one of said operating ports when the valve member is in a centered position and at least two of said spools moving out of full registration with two operating ports for communication thereof with the motor ports when the valve member is moved toward either end of the operating range, one valve member spool moving into full registration with one motor port when the valve member reaches one end of the operating range and another valve member spool moving into full registraiton with the other motor port when the valve member reaches the other end of the operating range.

4. A hydraulic tracing valve having a set of motor ports for connection to opposite sides of a single hydraulic motor and having a set of operating ports for connection to a pressure and return line, one of said sets having two ports and the other set having four ports, said valve member having a plurality of spaced lands operable to block a port when in full registration therewith, said lands spaced for fluid communication between the two ports of said one set and a first pair of ports of said other set respectively when the valve member is in a centered position, said valve member blocking said two ports of said one set from said first pair of ports of said other set and opening said two ports of said one set to a second pair of ports of said other set as said valve member is moved from the centered position toward either end of the operating range.

5. A hydraulic tracing valve having a set of operating ports and having a pair of motor ports, said valve having a valve member movable through a predetermined operating range, said valve member having a plurality of spaced lands operable to block a port when in full registration therewith, said lands spaced for fluid communication of each motor port with an operating port when the valve member is in a centered position, said valve member blocking one motor port and opening said one motor port for communication with another operating port as said valve member moves from the centered position to one end of the operating range, said valve member blocking the other motor port and opening said other motor port for communication with another operating port as said valve member moves from the centered position to the other end of the operating range.

6. A hydraulic tracing valve having a stylus and having four operating ports and two motor ports, said valve having a valve member movable through a predetermined operating rage in response to change in extent of deflection of the stylus, said valve member having four spaced spools each operable to block a port when in full registration therewith, two of said spools blocking a first pair of said operating ports and said two motor ports in communication respectively with a second pair of said operating ports when said valve member is in a centered position, each of said motor ports being blocked from one of said second pair of operating ports and placed in communication with one of said first pair of operating ports as the valve member moves to each end of the operating range from the centered position.

7. A hydraulic tracing valve having a set of operating ports and having a set of motor ports, one motor port positioned in staggered overlapping relation with one operating port to define a first pair of overlapped ports and another motor port positioned in staggered overlapping relation with another operating port to define a second pair of overlapped ports, said valve having a valve member movable through an operating range to block both ports of the first pair of overlapped ports and to expose the ports of the first pair of overlapped ports in sequence as the valve member moves in one direction through the operating range, said valve member exposing both ports of the second pair of overlapped ports and blocking the ports of the second pair of overlapped ports in sequence as the valve member moves in said one direction through the operating range.

8. A hydraulic tracing valve having a plurality of ports including two ports positioned in staggered overlapping relation to define a first pair of overlapped ports and including two other ports positioned in staggered overlapping relation to define a second pair of overlapped ports spaced from said first pair of overlapped ports, said valve having a valve member movable through an operating range sequentially to isolate both ports of the first pair of overlapped ports from each other and from all other ports in the valve, to isolate both ports of the first pair of overlapped ports from each other and expose one port of said first pair of overlapped ports to another port in the valve, and to expose both ports of the first pair of overlapped ports to each other as the valve member moves in one direction through the operating range, said valve member operable as it moves in said one direction through the operating range sequentially to expose both ports of the second pair of overlapped ports to each other, to isolate both ports of the second pair of overlapped ports from each other and expose one port of said second pair of ovrlapped ports to another port in the valve, and to isolate both ports of the second pair of overlapped ports from each other and from all other ports in the valve.

9. A hydraulic tracing system comprising in combination, a pressure line, a return line, two hydraulic motors, a hydraulic tracing valve having two valve portions and having a movable valve member portion in each valve portion, said tracing valve having a deflectable stylus and said valve member portions connected together and connected to the stylus for movement in unison through operating ranges in response to changes in the extent of deflection of the stylus, each valve portion having operating ports connected to the pressure line and return line and having motor ports connected to both sides of one of the motors, each valve member portion having lands to alternately block and expose at least four ports including two motor ports and two operating ports as it moves through its operating range, said valve member portions connected together to connect the two sides of one motor, respectively, to the pressure and return line when at least one side of the other motor is isolated from an operating line to produce staggered operation of the motors as the valve member portions move in unison through their operating ranges.

10. A hydraulic tracing valve having two valve portions for the control of two hydraulic motors, said tracing valve having a stylus and said valve portions having connected valve members connected to the stylus for movement in unison through a predetermined operating range in response to change in extent of deflection of the stylus through a predetermined zone of deflection, each valve portion operable to effect four changes in the operating condition of a motor as the valve member thereof moves through the operating range and said valve members connected together in predetermined relation to stagger the operating conditions of the motors.

11. In a hydraulic tracing system, the combination comprising, a first hydraulic motor and a second hydraulic motor, a hydraulic tracing valve having a stylus and having a first valve portion and a second valve portion, each of said valve portions having operating ports and having motor ports, the motor ports of the first valve portion connected to opposite sides of the first hydraulic motor and the motor ports of the second valve portion connected to opposite sides of the second hydraulic motor, said valve portions having connected valve members connected to the stylus for movement in unison through a predetermined operating range in response to change in the extent of deflection of the stylus through a predetermined zone of deflection, said valve members alternately blocking each of said motor and operating ports in the valve portions and exposing each of said ports to at least one other port in the valve portions as the valve members move through the operating range.

12. In a hydraulic tracing system, the combination comprising, a pressure line and a return line defining a pair of operating lines, a first hydraulic motor and a second hydraulic motor each having a pair of motor lines connected to opposite sides thereof, a hydraulic tracing valve having a stylus and having a first valve portion and a second valve portion, each of said valve portions having operating ports connected to the operating lines and each having motor ports connected to the motor lines of one of said hydraulic motors, said valve portions having connected valve members connected to the stylus for movement in unison through a predetermined operating range in response to change in the extent of deflection of the stylus through a predetermined zone of deflection, said valve members alternately blocking each of said motor and operating ports in the valve portions and exposing each of said ports to at least one other port in the valve portions as the valve members move through the operating range, each of said valve portions effecting four changes of operating condition of the motor connected thereto and effecting reversible operation thereof as the stylus moves through said predetermined zone of deflection, said valve members connected together in predetermined relation to effect staggered operation of the motors.

13. In a hydraulic tracing system, the combination comprising, a pressure line and a return line defining a pair of operating lines, a first hydraulic motor and a second hydraulic motor each having a pair of motor lines connected to opposite sides thereof, a hydraulic tracing valve having a stylus and having a first valve portion and a second valve portion, each of said valve portions having operating ports connected to the operating lines and each having motor ports positioned in staggered overlapping relation to the operating ports and connected to the motor lines of one of said motors, said valve portions having connected valve members connected to the stylus for movement in unison through a predetermined operating range in response to change in the extent of deflection of the stylus through a predetermined zone of deflection, said valve portions having lands to control the ports in the valve portions, some of said lands controlling the ports positioned in staggered relation to alternately expose the staggered ports in sequence and to block the staggered ports in sequence as the valve members move in one direction and the other through the operating range.

14. A hydrulic tracing valve having a stylus and having a first valve portion and a second valve portion, each valve portion having motor ports and operating ports, said valve portions having, respectively, valve members connected together and to the stylus for movement in unison in response to change in extent of deflection of the stylus through a predetermined zone of deflection, said stylus deflected from a first position at one end of said zone of deflection through a second, third, and fourth position to a fifth position at the opposite end of said zone of deflection in sequence as the deflection of the stylus is increased, one valve member connecting two motor ports to two operating ports, respectively and the other valve member isolating at least one motor port at said first, third, and fifth deflected positions of the stylus, said one valve member isolating at least one motor port and said other valve member connecting two motor ports to two operating ports, respectively, at said second and fourth deflected positions of the stylus.

15. In a hydraulic tracing system, the combination comprising a pressure line and a return line defining a pair of operating lines, a first hydraulic motor and a second hydraulic motor each having a pair of motor lines connected to opposite sides thereof, a hydraulic tracing valve having a stylus and having a first valve portion and a second valve portion, each of said valve portions having operating ports connected to the operating lines and having motor parts connected to the motor lines of one of said motors, said valve portions having connected valve members connected to the stylus for movement in unison through a predetermined operating range in response to change in the extent of deflection of the stylus through a predetermined zone of deflection, said stylus deflected in sequence from a first deflected position through second, third, and fourth deflected positions to a fifth deflected position as the deflection of the stylus increases through said predetermined zone of deflection, said valve members having lands positioned thereon and cooperating with said motor and operating ports to control connection of said motor lines to said operating lines, one valve member effecting connection of the motor lines of the first hydraulic motor to the operating lines, respectively, in predetermined order when the stylus is in said first and fifth position and in reverse order when the stylus is in said third position, the other valve member isolating at least one motor line of the second hydraulic motor from all operating ports when the stylus is in the first, third, and fifth positions, said one valve member isolating at least one motor port from all the operating ports when the stylus is in the second and fourth positions, and said other valve member effecting connection of the motor lines of the second hydraulic motor to the operating lines in predetermined order in the second position of the stylus and in reverse order in the fourth position of the stylus.

16. In a hydraulic tracing system, the combination comprising a pressure line and a return line defining a pair of complementary operating lines, a first hydraulic motor and a second hydraulic motor, a hydraulic tracing valve having a stylus and having a first valve portion and a second valve portion, each of said valve portions connected to the complementary operating lines, said first valve portion connected to both sides of the first hydraulic motor and said second valve portion connected to both sides of the second hydraulic motor, each of said valve portions having movable valve member portions therein, said valve member portions connected together and connected to the stylus for movement in unison through predetermined operating ranges in response to change in the extent of deflection of the stylus through a predetermined zone of deflection, said valve member portions each having passages for selective connection of the motors to the operating lines as the valve member portions move through the operating ranges, said first valve member portion connecting the two sides of the first hydraulic motor to the two complementary operating lines, respectively, in predetermined order when the first valve member portion is in a centered position in the operating range, said first valve member portion as it moves in either direction from said centered position isolating at least one side of the first hydraulic motor from an operating line and then connecting the two sides of the first hydraulic motor to the operating lines in reverse order from said predetermined order, said second valve member portion isolating at least one side of said second hydraulic motor from an operating line when the second valve member portion is in a centered position in the operating range, said second valve member portion as it moves in one direction from said centered position connecting the two sides of the second hydraulic motor respectively to the operating lines in predetermined order and then isolating at least one side of the second hydraulic motor from an operating port, said second valve member portion as it moves in the opposite direction from said centered position connecting the two sides of the second hydraulic motor respectively to the operating lines in reverse order from said predetermined order and then isolating at least one side of the second hydraulic motor from an operating port.

References Cited by the Examiner

UNITED STATES PATENTS

| | | | |
|---|---|---|---|
| 2,079,720 | 5/1937 | Shaw | 251—3 X |
| 2,791,885 | 5/1957 | Sassen | 91—413 X |
| 3,026,680 | 3/1962 | Evans | 251—3 X |

EDGAR W. GEOGHEGAN, *Primary Examiner.*